May 10, 1966 MOTOSHI SEKI 3,250,481

MAGAZINE TYPE MAGNETIC RECORDING AND REPRODUCING MACHINES

Filed Sept. 24, 1963 2 Sheets-Sheet 1

MAGAZINE TYPE MAGNETIC RECORDING AND REPRODUCING MACHINES

Filed Sept. 24, 1963 2 Sheets-Sheet 2

United States Patent Office 3,250,481
Patented May 10, 1966

3,250,481

MAGAZINE TYPE MAGNETIC RECORDING AND REPRODUCING MACHINES

Motoshi Seki, Ota-shi, Gunma-ken, Japan, assignor to Sanyo Electric Co., Ltd., Moriguchi-shi, Japan, and Tokyo Sanyo Electric Co., Ltd., Ora-gun, Gunma-ken, Japan, both corporations of Japan Filed Sept. 24, 1963, Ser. No. 311,043
Claims priority, application Japan, Feb. 5, 1963, 38/6,271
2 Claims. (Cl. 242—55.13)

This invention relates to magazine type magnetic recording and reproducing machines, and more particularly to tape magazines therefor.

A magazine type magnetic recording and reproducing machine comprises a detachable tape magazine in which a pair of tape reels are disposed in superposed relation with each other, one above the other, and are rotatably mounted therein independently but about a common axis. The magnetic tape is unwound from one reel while taken up by the other, and vice versa, during recording and reproducing operations. In such an arrangement, it has heretobefore been the fact that relatively complicated mechanisms are required for reversing the direction of rotation of reels.

The primary object of the present invention is to provide a detachable tape magazine of the kind specified in which two tape reels are rotatably mounted in superposed relation with each other and may be driven and rotated in either direction selectively by mere angular displacement of a driving shaft disposed between the two reels.

Another object of the present invention is to provide a tape magazine of the kind above specified in which the driving shaft is automatically positioned between the two reels when the detachable magazine has been placed in position on or relative to the machine proper.

Another object of the present invention is to provide a tape magazine of the kind above specified, in which a mechanical brake system is incorporated and is normally applied to the tape reels but automatically released when the machine is in recording, reproducing or rewinding operation.

A further object of the present invention is to provide a detachable tape magazine of the kind above specified in which the brake releasing means are associated with a control switch for controlling energization and deenergization of the reel driving motor.

There are other objects and particularities of the present invention which will be made obvious by the detailed description of a preferred embodiment of the present invention with reference to the accompanying drawings, in which.

Figure 1:
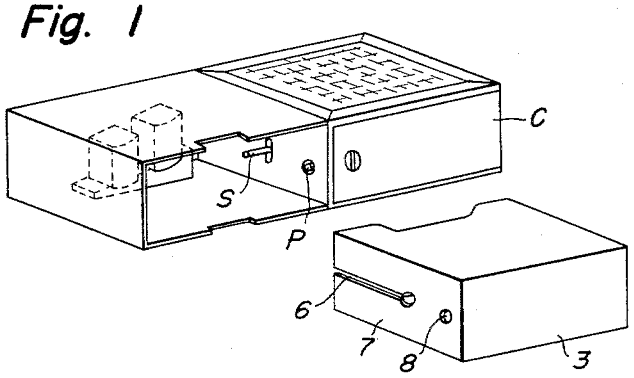
FIG. 1 is a perspective view of a magnetic recording and reproducing machine having in association therewith a detachable tape magazine embodying the present invention, the magazine being out of the machine.
Figure 2:
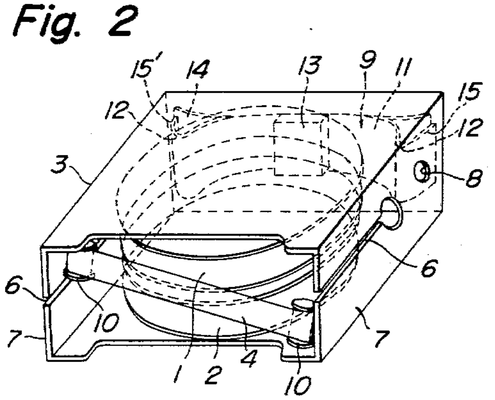
FIG. 2 is a perspective view of the tape magazine shown in FIG. 1.
Figure 3:
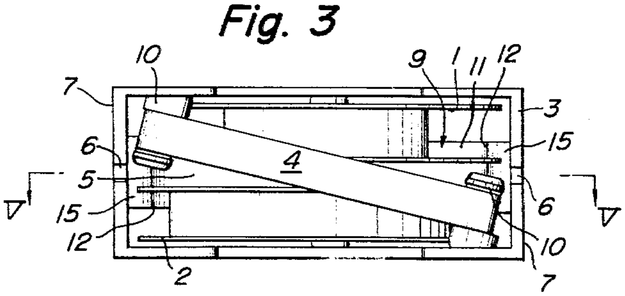
FIG. 3 is a front elevational view of the same.

Referring to FIG. 1 of the drawings, the magnetic recording and reproducing machine shown comprises a body casing C, in which a driving electric motor, not shown, is mounted and is provided with a driving shaft S which extends horizontally in general and partly projects beyond a side wall of casing C. The electric motor as a whole is mounted swingable within a limited extent, so that the shaft S may be tilted up and down about a horizontal axis. For detailed explanation, copending United States patent application Serial No. 279,894 is referred to.

Now referring to FIGS. 2 to 6, the tape magazine comprises a housing 3 adapted to snugly fit into a corresponding recess formed in the casing C.

The tape magazine is provided therein with a pair of tape reels 1 and 2 in superposed relation with each other. The first reel 1 and the second reel 2 are rotatably mounted separately on a common vertical axis. The magazine housing 3 has one side open, and a magnetic tape 4 is wound and rewound from one reel 1 or 2 to the other reel 2 or 1 by way of a slanted path extending along the open side of housing 3 between stationary guide rollers 10 and 10.

Figure 4:
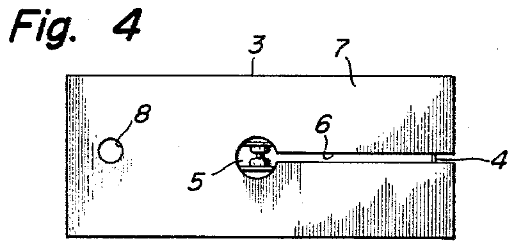
FIG. 4 is a side elevational view of the same.

The tape magazine according to the present invention is provided with guide grooves 6 and 6 in the opposite side walls 7 and 7 of housing 3, through which grooves either, the driving shaft S can extend into the housing 3 between the pair of reels 1 and 2. The space 5 between two reels 1 and 2 is sufficiently wide to receive the driving shaft S freely, but when the driving shaft S is tilted up or down, the shaft S frictionally engages reels 1 or 2, as the case may be, for completing driving connection therebetween. The grooves 6 extend to such extent, as shown in FIG. 4, so that the common axis of reels 1 and 2 may be observed through the grooves 6.

The magazine housing 3 is also provided with guide holes 8 and 8 in the opposite side walls 7, 7, through which holes, a brake-releasing bar P may be inserted into the housing 3. The brake-releasing bar P is mounted in the machine casing C and is mechanically connected with a control switch, not shown, of the driving motor, so that, when the control switch is closed for energizing the driving motor, the bar P is inserted into the magazine housing 3 through either hole 8 for releasing the brake to be described. When the control switch is open, the bar P is retracted into the casing C.

After a half-width recording or reproducing has been completed, the other half-width recording or reproducing operation may be effected by withdrawing the tape magazine 3 from the body casing C and re-inserting the same thereinto in the reversed position, upside down. Such a reversing operation may be effected speedily without need of any special attention or skill.

Figure 5:
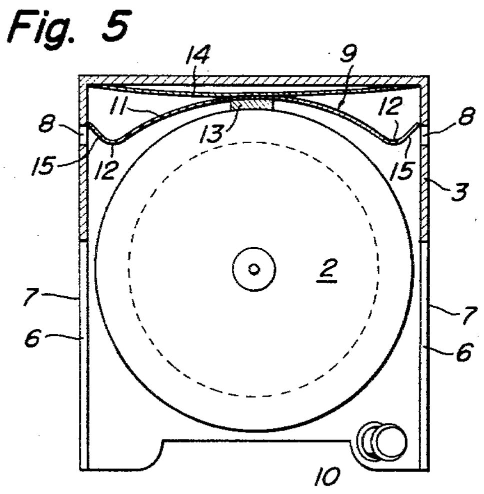
FIG. 5 is a sectional plan view taken at line V—V in FIG. 3.
Figure 6:
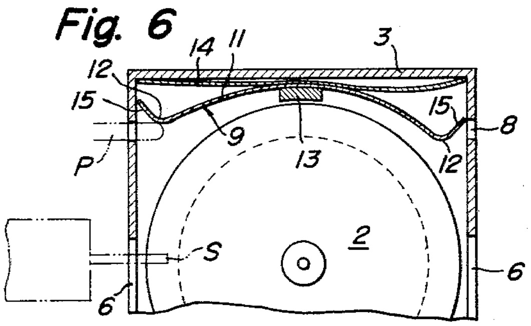
FIG. 6 is a partial plan view similar to FIG. 5, but with the brake device at the released position.

Referring particularly to FIGS. 5 and 6, the brake device associated with the two reels 1 and 2 in the tape magazine is in interconnection with the reel drive operation. When the tape magazine 3 is properly positioned on the machine casing C, the brake-releasing bar P may be inserted into the tape magazine through either hole 8, as the case may be. The brake device 9 comprises a brake spring 11 of generally arcuate configuration mounted spanning between holes 8 and 8, with opposite bent-back end portions 15, 15 clearing off the respective holes 8, the bents 12, 12 approaching the peripheries of reels 1 and 2, with a frictional element or brake shoe 13 fixed to the spring 11 for engaging the reel peripheries. In addition to the brake spring 11, it is preferable to provide a booster spring 14 for applying a resilient force to the brake spring 11 in the direction towards the tape reels.

When the brake-releasing bar P has been inserted into the housing 3 through either hole 8, as imaginarily shown in FIG. 6, the corresponding bent 12 is moved away from the reel peripheries, so that the brake shoe 13 is released against the spring 14.

Normally, the brake device is held in brake-applying position as shown in FIG. 5. The opposite end portions 15, 15 of brake spring 11 beyond the bents 12, 12 extend to cross diagonally the path of brake-releasing bar P. When, in response to closing of the control switch, the bar P is inserted into the tape magazine through either hole 8, it drives the corresponding bent 12 of spring 11 away from the reel peripheries to release the brake.

When the control switch is operated to OFF position, the brake-releasing bar P is retracted into the body casing C, and the brake spring 11 is allowed to return to the normal position for applying the brake to the tape reels.

What is claimed is:

1. A tape magazine for use in association with a magnetic recording and reproducing machine, the magazine comprising a housing with one side open, a pair of tape reels rotatably mounted within said housing in superposed relation with each other, said housing having opposite side walls parallel to the rotating axis of said reels, a guide groove formed in each of said opposite side walls for insertion therethrough of a driving shaft of said machine, a brake device associated with said reels within said housing, and a guide hole formed in each of said opposite side walls for insertion therethrough of a brake-releasing bar interconnected with said machine, whereby said brake device is released when said machine is in operation, said pair of tape reels providing a space therebetween, in which space said driving shaft is tiltable up and down for making driving contact with either of said reels.

2. The tape magazine according to claim 1, in which said brake device comprises a brake spring and a brake shoe normally urged into frictional contact with said reels by said spring, said brake shoe being released when said brake-releasing bar has been inserted into said housing.

No references cited.

MERVIN STEIN, *Primary Examiner.*

G. F. MAUTZ, *Assistant Examiner.*